(12) United States Patent
Zhang et al.

(10) Patent No.: US 12,480,174 B2
(45) Date of Patent: Nov. 25, 2025

(54) 600 MPA GRADE NON-ORIENTED ELECTRICAL STEEL SHEET AND MANUFACTURING METHOD THEREOF

(71) Applicant: BAOSHAN IRON & STEEL CO., LTD, Shanghai (CN)

(72) Inventors: Feng Zhang, Shanghai (CN); Baojun Liu, Shanghai (CN); Jun Li, Shanghai (CN); Bo Wang, Shanghai (CN); Kanyi Shen, Shanghai (CN); Guobao Li, Shanghai (CN)

(73) Assignee: BAOSHAN IRON & STEEL CO., LTD, Shanghai (CN)

( * ) Notice: Subject to any disclaimer, the term of this patent is extended or adjusted under 35 U.S.C. 154(b) by 514 days.

(21) Appl. No.: 17/636,787

(22) PCT Filed: Aug. 26, 2020

(86) PCT No.: PCT/CN2020/111402
§ 371 (c)(1),
(2) Date: Feb. 18, 2022

(87) PCT Pub. No.: WO2021/037061
PCT Pub. Date: Mar. 4, 2021

(65) Prior Publication Data
US 2022/0275472 A1    Sep. 1, 2022

(30) Foreign Application Priority Data
Aug. 26, 2019    (CN) .......................... 201910790407.1

(51) Int. Cl.
| | |
|---|---|
| *C21D 9/46* | (2006.01) |
| *C21D 6/00* | (2006.01) |
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/60* | (2006.01) |
| *H01F 1/147* | (2006.01) |

(52) U.S. Cl.
CPC .............. *C21D 9/46* (2013.01); *C21D 6/008* (2013.01); *C21D 8/1222* (2013.01); *C21D 8/1233* (2013.01); *C21D 8/1261* (2013.01); *C21D 8/1283* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/14* (2013.01); *C22C 38/60* (2013.01); *H01F 1/147* (2013.01)

(58) Field of Classification Search
CPC . C21D 1/28; C21D 1/76; C21D 6/005; C21D 6/008; C21D 8/1222; C21D 8/1233; C21D 8/1244; C21D 8/1261; C21D 8/1272; C21D 8/1283; C21D 9/46; C22C 33/04; C22C 38/001; C22C 38/002; C22C 38/004; C22C 38/005; C22C 38/008; C22C 38/02; C22C 38/04; C22C 38/06; C22C 38/14; C22C 38/60; H01F 1/147
See application file for complete search history.

(56) References Cited

U.S. PATENT DOCUMENTS

| | | | |
|---|---|---|---|
| 2009/0250145 A1* | 10/2009 | Kurosaki | ................ C22C 38/04 148/546 |
| 2010/0043928 A1* | 2/2010 | Sung | ........................ C21D 9/46 148/660 |
| 2012/0267015 A1 | 10/2012 | Kim et al. | |
| 2012/0298267 A1 | 11/2012 | Hu et al. | |
| 2014/0373340 A1 | 12/2014 | Dorninger et al. | |
| 2015/0034212 A1 | 2/2015 | Zhang et al. | |
| 2015/0059929 A1 | 3/2015 | Zaizen et al. | |
| 2017/0362677 A1 | 12/2017 | Kim et al. | |
| 2019/0017135 A1 | 1/2019 | Lee et al. | |
| 2022/0186330 A1* | 6/2022 | Murakawa | ............ C22C 38/008 |

FOREIGN PATENT DOCUMENTS

| | | |
|---|---|---|
| CN | 103498096 A | 1/2014 |
| CN | 103834858 A | 6/2014 |
| CN | 103882288 A | 6/2014 |

(Continued)

OTHER PUBLICATIONS

Office Action for corresponding Japanese Application No. 511372/2022, issued from the Japanese Patent Office, dated: Apr. 4, 2023.
Office Action for corresponding Brazilian Application No. BR112022003061, issued from the Brazilian Patent Office, dated: May 10, 2023.
International Search Report of PCT/CN2020/111402 dated Nov. 9, 2020.
Extended European Search Report issued in connection with corresponding European Patent Application No. 20856427.8 on Jun. 22, 2022, from the European Patent Office.
Examination Report issued in connection with corresponding Indian Patent Application No. 202247009252 on Apr. 11, 2022, from the Indian Patent Office.

(Continued)

*Primary Examiner* — Jenny R Wu
(74) *Attorney, Agent, or Firm* — Elizabeth L. Neal; DeWitt LLP

(57) ABSTRACT

Provided is a 600 MPa grade non-oriented electrical steel sheet with excellent magnetic properties, comprising the following chemical elements in mass percentage: $0 < C \leq 0.0035\%$; Si: 2.0-3.5%; Mn: 0.4-1.2%; P: 0.03-0.2%; Al: 0.4-2.0%; and the balance being Fe and unavoidable impurities. Also provided is a manufacturing method for the 600 MPa grade non-oriented electrical steel as described above, including the following steps: (1) converter smelting, RH refining and casting; (2) hot rolling; (3) normalizing; (4) cold rolling; (5) continuous annealing; and (6) applying an insulation coating to obtain a finished non-oriented electrical steel sheet.

11 Claims, 3 Drawing Sheets

(56) References Cited

FOREIGN PATENT DOCUMENTS

| | | | |
|---|---|---|---|
| CN | 103882296 A | 6/2014 | |
| CN | 108570595 A | 9/2018 | |
| JP | S64226 A | 1/1989 | |
| JP | 2003226948 A | * 8/2003 | |
| JP | 2004300535 A | * 10/2004 | ........... C21D 8/1272 |
| JP | 2005113185 A | 4/2005 | |
| JP | 2005206887 A | 8/2005 | |
| JP | 2005330527 A | 12/2005 | |
| JP | 2013515166 A | 5/2013 | |
| JP | 2013189693 A | 9/2013 | |
| JP | 2015515541 A | 5/2015 | |
| JP | 2018021242 A | 2/2018 | |
| JP | 2018154853 A | 10/2018 | |
| JP | 2018168413 A | 11/2018 | |
| RU | 2278171 C2 | 6/2006 | |
| RU | 2398894 C1 | 9/2010 | |
| RU | 2489500 C1 | 8/2013 | |

OTHER PUBLICATIONS

Office action issued in connection with corresponding Canadian Patent Application No. 3,146,888 on Dec. 16, 2022 from the Canadian Patent Office.

First Office action issued in connection with corresponding Russian Patent Application No. 2022104391 on Aug. 30, 2022 from the Russian Patent Office.

First Search Report issued in connection with corresponding Russian Patent Application No. 2022104391 on Aug. 11, 2022 from the Russian Patent Office.

\* cited by examiner

600 MPA GRADE NON-ORIENTED ELECTRICAL STEEL SHEET AND MANUFACTURING METHOD THEREOF

CROSS-REFERENCE TO RELATED APPLICATIONS

The present application is the U.S. National Stage application of International Application No. PCT/CN2020/111402, filed Aug. 26, 2020, which International Application was published on Mar. 4, 2021, as International Publication No. WO2021/037061. The International Application claims priority to Chinese Patent Application No. 201910790404.1, filed Aug. 26, 2019, the contents of which are incorporated herein by reference in their entireties.

TECHNICAL FIELD

The present invention relates to a steel sheet and a manufacturing method therefor, in particular to a non-oriented electrical steel sheet and a manufacturing method therefor.

BACKGROUND

With an increasing demand for high efficiency, energy conservation and environment protection in a user market, a non-oriented electrical steel sheet for manufacturing an iron core of a motor or a compressor is required to have good electromagnetic properties (i.e., an ultralow iron loss and an ultrahigh magnetic induction) on the premise that the price advantage is guaranteed. Meanwhile, with development demands on the miniaturization, precision and high efficiency of power-driven equipment, the strength of the non-oriented electrical steel sheet is strictly required.

CN 104726794 A (published on Jun. 24, 2015, "Non-oriented Electrical Steel Sheet and Manufacturing Method thereof") discloses a non-oriented electrical steel sheet and a manufacturing method thereof. In this disclosure, the iron loss is reduced by: adding Si and Al into steel as much as possible to remarkably increase the electrical resistivity of a finished steel sheet so as to reduce the iron loss; and adding a certain amount of P and Cr, resulting the iron loss of the finished steel sheet and particularly the iron loss in a high-frequency state being reduced. However, these measures may limit the increase of a normalizing temperature and lower the manufacturability of cold rolling to a certain extent and may also degrade the magnetic induction of the finished steel sheet.

CN 103882293 A (published on Jun. 25, 2014, "Non-oriented Electrical Steel Sheet and Manufacturing Method thereof") discloses a non-oriented electrical steel sheet and a manufacturing method thereof. In this disclosure, the precipitation of sulfide inclusions in hot rolling and heat treatment processes can be favorably inhibited by treating with calcium and rare earth in a steel-making process. For a heat with Si<1%, after treated with calcium and rare earth, the removal and denaturation of large-size inclusions in the steel are very effective, the number of precipitates is significantly reduced and the size is coarsened, and the iron loss can be reduced by 0.4-0.8 W/kg without normalizing. For electrical steel containing 0.8%-1.6% of Si, by adding a suitable amount of rare earth elements Pr and Nd and utilizing a reasonable rolling process, grains can also be coarsened, the magnetic hysteresis loss can be effectively reduced, and the structure of the steel sheet can be further improved to increase the magnetic induction intensity.

In order to relieve the contradiction among thickness reduction, high mechanical properties and good electromagnetic properties, JP H1161257 A (published on Mar. 5, 1999, "Non-oriented Electrical Steel with Low Iron Loss and Low Anisotropy and Manufacturing Method thereof") discloses an electrical steel and a manufacturing method thereof. In this disclosure, a low-temperature heating treatment is performed on a continuous casting billet at 950-1150° C., and an intermediate billet is heat-retained after rough rolling in hot rolling, wherein the temperature drop before finish rolling is required to be controlled within 40° C., the finishing rolling temperature of finish rolling is required to be controlled to be Ar1 (phase transformation point)+20° C. or above, and a coiling temperature is limited to be 640-750° C. By using such control methods, a non-oriented electrical steel sheet with low anisotropy can be achieved.

JP H11189824 A (published on Jul. 13, 1999, "Manufacturing method for Non-oriented Electrical Steel Sheet with Low Iron Loss") discloses a non-oriented silicon steel with high strength and low iron loss. In this disclosure, the content of S is limited to be within 10 ppm, the content of P is limited to be 0.03-0.15%. Before double cold rolling and intermediate annealing, a hot-rolled strip steel is normalized in $H_2$ atmosphere ($H_2$ content being 60% or above) and is subjected to soaking for 1-6 h. In this way, a lower iron loss and higher mechanical strength can be achieved after subsequent high-temperature continuous annealing.

CN 102453837 A (published on May 16, 2012, "Manufacturing method for Non-oriented Silicon Steel with High Magnetic Induction") discloses a non-oriented silicon steel with high magnetic induction. In this disclosure, the manufacturing method includes the following steps: 1) smelting and casting (steel-making, secondary refining, and casting to form a casting billet), wherein the non-oriented silicon steel includes the chemical elements in mass percentage: 0.1-1% of Si, 0.005-1% of Al, ≤0.004% of C, 0.10-1.50% of Mn, ≤0.2% of P, ≤0.005% of S, ≤0.002% of N, ≤0.006% of Nb+V+Ti and the balance being Fe; 2) hot rolling, wherein the heating temperature ranges from 1150° C. to 1200° C., the finishing rolling temperature ranges from 830° C. to 900° C., and coiling is performed at the temperature of ≥570° C.; 3) flattening, which is a cold rolling with a reduction ratio of 2-5%; 4) normalizing, wherein it is performed at a temperature of not lower than 950° C. for 30-180 s; 5) acid pickling and cold rolling, i.e., performing cold rolling with an accumulative reduction ratio of 70-80% after acid pickling; and 6) annealing, wherein the heating rate is ≥100° C./s, the steel is kept at 800-1000° C. for 5-60 s, and the steel is slowly cooled to 600-750° C. at a rate of 3-15° C./s.

SUMMARY

One objective of the present invention is to provide a high-strength non-oriented electrical steel sheet with excellent magnetic properties. By optimizing the design of the chemical composition of high-strength non-oriented electrical steel sheets, the cleanliness of steel is improved, and thus high-strength non-oriented electrical steel sheets with excellent magnetic properties are obtained.

In order to achieve the above-mentioned objective, the present invention provides a high-strength non-oriented electrical steel sheet with excellent magnetic properties, comprising the following chemical elements in mass percentage:

0<C≤0.0035%; Si: 2.0-3.5%; Mn: 0.4-1.2%; P: 0.03-0.2%; Al: 0.4-2.0%; and the balance being Fe and unavoidable impurities.

For the high-strength non-oriented electrical steel sheet with excellent magnetic properties according to the present invention, the design principles of each chemical element are as follows.

C: in the high-strength non-oriented electrical steel sheet according to the present invention, C will strongly hinder the growth of grains of a finished steel sheet and easily combine with Nb, V, Ti and the like to form fine precipitates, thereby causing increased loss and generating magnetic aging. On this basis, the mass percentage of C in the high-strength non-oriented electrical steel sheet according to the present invention is controlled to be >0 and ≤0.0035%.

Si: in the high-strength non-oriented electrical steel sheet according to the present invention, Si increases the electrical resistivity of a material and can effectively reduce the iron loss of steel. When the mass percentage of Si is higher than 3.5%, the magnetic induction of the steel will be significantly lowered, and the rollability of cold rolling will be significantly lowered; and when the mass percentage of Si is lower than 2.0%, the effect of effectively reducing the iron loss cannot be achieved. On this basis, the mass percentage of Si in the high-strength non-oriented electrical steel sheet according to the present invention is controlled to be 2.0-3.5%.

Mn: in the high-strength non-oriented electrical steel sheet according to the present invention, when the mass percentage of Mn is lower than 0.4%, the effect of improving the strength of steel cannot be achieved; and when the mass percentage of Mn is higher than 1.2%, the manufacturing cost of the steel will be increased, and a recrystallization effect of the steel will be inhibited. On this basis, the mass percentage of Mn in the high-strength non-oriented electrical steel sheet according to the present invention is controlled to be 0.4-1.2%.

P: in the high-strength non-oriented electrical steel sheet according to the present invention, when the mass percentage of P is lower than 0.03%, it is not conducive to increase the electrical resistivity and {100} component; and when the mass percentage of P is higher than 0.2%, it tends to cause cold brittleness and reduce the manufacturability of cold rolling. On this basis, the mass percentage of P in the high-strength non-oriented electrical steel sheet according to the present invention is controlled to be 0.03-0.2%.

Al: Al increases the electrical resistivity of the material and can effectively reduce the iron loss of steel. When the content of Al is higher than 2.0%, the magnetic induction of the steel will be significantly lowered, and the rollability of cold rolling will be significantly lowered; and when the content of Al is lower than 0.4%, the effect of effectively reducing the iron loss cannot be achieved. On this basis, the mass percentage of Al in the high-strength non-oriented electrical steel sheet according to the present invention is controlled to be 0.4-2.0%.

Preferably, the high-strength non-oriented electrical steel sheet according to the present invention further includes at least one of Sb and Sn in a total content of 0.003-0.2% by mass.

In the above-mentioned solution, the total content of at least one of Sb and Sn is set to be 0.003-0.2% due to the facts that: when the mass percentage of Sn and Sb is lower than 0.003%, the effects of improving a texture of steel and improving the magnetic induction of steel cannot be achieved; and when the mass percentage of Sn and Sb is higher than 0.2%, the crystal grains will be refined and the magnetic properties of the steel will be deteriorated.

Preferably, the high-strength non-oriented electrical steel sheet according to the present invention further comprises at least one of Mg, Ca and REM (Rare Earth Metal) in a total content of 0.0005-0.01% by mass.

In the above-mentioned solution, the total content of at least one of Mg, Ca and REM is set to be 0.0005-0.01% due to the facts that: when the mass percentage of Mg, Ca and REM is lower than 0.0005%, the effect of removing oxygen and sulfide inclusions cannot be achieved; and when the mass percentage of Ca is higher than 0.01%, grain refinement tends to occur and rollability of cold rolling will be lowered.

Preferably, in the high-strength non-oriented electrical steel sheet according to the present invention, the unavoidable impurities include: S≤0.003%; Ti≤0.001%; O≤0.002%; and N≤0.002%.

In the above-mentioned solution, the unavoidable impurities should be controlled to be as less as possible. When the mass percentage of S exceeds 0.003%, the quantity of harmful inclusions such as MnS and $Cu_2S$ will be greatly increased to strongly restrict the growth of grains and degrade the magnetic properties of the steel.

When the mass percentage of N is higher than 0.002%, precipitates, such as Nb, V, Ti and Al, of N are greatly increased to strongly hinder the growth of the grains and degrade the magnetic properties of the steel.

When the mass percentage of O exceeds 0.002%, the quantity of oxide inclusions will be greatly increased to cause grain refinement and degrade the magnetic properties of the steel.

When the mass percentage of Ti exceeds 0.001%, inclusions of Ti with C and N will be greatly increased to strongly hinder the growth of grains and degrade the magnetic properties of the steel.

Preferably, in the high-strength non-oriented electrical steel sheet according to the present invention, a proportion of a {100} plane texture is ≥25%, and a proportion of a {111} plane texture is ≤31%. Herein, the {100} plane texture and {111} plane texture were measured with a SmartLab X-ray diffractometer according to "Metal material—Quantitative pole figure preparing method" (YB/T 5360-2006).

Preferably, the high-strength non-oriented electrical steel sheet according to the present invention contains inclusions with a size greater than 0.5 μm, wherein the inclusions are at least one of AlN, CaS, and composite inclusions of AlN and CaS.

Preferably, the high-strength non-oriented electrical steel sheet according to the present invention has an iron loss $P_{15/50}$ of ≤2 W/kg, a magnetic induction $B_{50}$ of ≥1.69 T and a tensile strength of ≥600 MPa. Herein, the electromagnetic properties were measured with a Brockhaus magnetic measurement equipment (Germany) according to the Epstein square method (GB 10129-1988). Herein, $P_{10/50}$ represents an iron loss value tested under the conditions of 1.0 T and 50 Hz, and $B_{50}$ represents a magnetic induction value tested under the condition of 5000 A/m. The mechanical properties were measured with a 250 kN/500 kN sheet tensile testing machine according to "Metallic materials—Test pieces for tensile testing" (GB/T 6397-1986).

Correspondingly, another objective of the present invention is to provide a manufacturing method for the above-mentioned high-strength non-oriented electrical steel sheet. By using the manufacturing method, a high-strength non-oriented electrical steel sheet with improved cleanliness and excellent magnetic properties can be obtained.

In order to achieve the above-mentioned inventive objective, the present invention provides a manufacturing method for the above-mentioned high-strength non-oriented electrical steel sheet, including the following steps:

converter smelting, RH refining and casting;
hot rolling;
normalizing;
cold rolling; and
continuous annealing: rapidly heating a cold-rolled steel sheet from an initial temperature for rapid heating $T_{rapid\ heating\ initial}$ to a soaking temperature at a heating rate of 50-2000° C./s to perform rapid heating annealing, wherein a volume content of $H_2$ in an annealing furnace is ≥55% and a dew point in the annealing furnace is ≤−30° C.; and after the rapid heating annealing, slowly cooling the steel sheet at a cooling rate ≤5° C./s; and
applying an insulation coating to obtain a finished non-oriented electrical steel sheet.

In the manufacturing method according to the present invention, the heating rate is controlled to be 50-2000° C./s due to the facts that: if the heating rate is too fast, the requirements for equipment capabilities will be too high, the cost will be expensive, and the residence time of the cold-rolled steel sheet in the high temperature stage will be too long, resulting in poor uniformity of the grain structure. Meanwhile, in view of the fact that (internal) oxidation and nitridation are prone to occur on the surface of the finished steel sheet under high temperature annealing conditions, it will result in grain refinement, the deterioration of iron loss of finished steel sheet and the decrease of the surface quality of finished steel sheet. Therefore, the volume content of $H_2$ in the annealing furnace is controlled to be ≥55% and a dew point in the annealing furnace is controlled to be ≤−30° C.

After the rapid heating annealing, the finished steel sheet is required to be slowly cooled, and a cooling rate is required to be limited to be ≤5° C./s, so as to control the shape of the finished steel sheet and to reduce the stress in the steel sheet, and thus, the finally obtained non-oriented electrical steel sheet has good surface condition and is characterized by high magnetic induction, low iron loss and high strength.

Preferably, in the manufacturing method according to the present invention, in the step of continuous annealing, the heating rate is 100-600° C./s.

Preferably, in the manufacturing method according to the present invention, in the step of continuous annealing, the initial temperature $T_{rapid\ heating\ initial}$ ranges from room temperature to 750° C. Herein, 750° C. is selected as the maximum initial temperature for rapid heating, and the main considerations are as follows: if the temperature is higher than 750° C., in the subsequent rapid heating process, in order to ensure a suitable soaking temperature and heating rate, the requirements for the configuration of the rapid heating equipment will be too high, and the economy and stability will be insufficient.

Preferably, in the manufacturing method according to the present invention, in the step of RH refining, a value of t/ΣAl is 0.30-0.65, wherein t represents a time interval in minutes between adding the at least one of elements Mg, Ca and REM and adding the element Al, and ΣAl represents a total time in minutes from adding the element Al to the end of RH refining.

In the above-mentioned solution, a suitable amount of P is required to be added into steel in the smelting process, so that the recrystallization effect of a hot-rolled steel sheet can be improved, and the grain size of the finished steel sheet can be controlled. By reasonably controlling the P content in the steel, and by controlling the finishing temperature for hot rolling and coiling temperature (under the ordinary tapping temperature conditions of continuous casting billets), a good recrystallization effect of hot-rolled steel sheet can be achieved, the recrystallization rate of fiber structure of hot-rolled steel sheet can be increased, and the structure uniformity of hot-rolled steel sheet can be improved. The control of P content is critical. On one hand, the P content is related to the contents of Si and Al (the higher the contents of Si and Al, the lower the content of P should be). P is prone to cause cold brittleness, thereby resulting in edge cracks and rolling fractures of the finished steel sheet in a cold rolling process. If the hot-rolled and cold-rolled fiber structures are developed, it will further lead to the development of coarse deformed grains, resulting in the surface of finished steel sheets prone to corrugated defects and the grains in finished steel sheets being refined to deteriorate the electromagnetic properties of finished steel sheets. On the other hand, as mentioned above, similar to Si, P has the effects of significantly improving the electrical resistivity of finished steel sheets and accelerating the growth of grains in finished steel sheets, thereby improving the magnetic induction of finished steel sheets and reducing the iron loss of finished steel sheets. Therefore, a suitable content of P is critical for obtaining non-oriented electrical steel sheets with excellent magnetic properties.

In order to improve the magnetic induction of finished steel sheets, the content of Ti in steel is required to be controlled to be ≤0.001%, so that the inhibition effect of TiN inclusions in the finished steel sheet on the growth of grain size can be effectively avoided in the continuous annealing process, and the magnetic induction of finished steel sheets can be effectively improved.

In the RH refining process, when performing deoxidation alloying after decarbonization, Si is utilized for deoxidation to avoid the direct use of aluminum for deoxidation and the formation of fine-sized inclusions. After ferro-silicon alloy is added, silicon oxide inclusions are easier to float up and remove. Afterwards, as the viscosity of the molten steel increases, the alumina inclusions are not easy to float up and remove; thus, the alumina inclusions are treated with Mg, Ca and REM to generate aluminate compounds with a lower melting point, and at the same time, to suppress fine and dispersed small particle inclusions. In order to ensure the treatment effect of Mg, Ca and REM, in addition to controlling the addition amount of Mg, Ca and REM, the value of t/ΣAl may be preferably controlled to be 0.30-0.65, so as to ensure the effective concentrations of Mg, Ca and REM in the molten steel, thereby ensuring that the inclusions can be fully denatured. By controlling the residence time of Mg, Ca and REM in the molten steel, the molten steel can fully react with Mg, Ca and REM, so as to achieve a good effect of improving inclusions.

Preferably, in the manufacturing method according to the present invention, in the step of hot rolling, a finishing rolling temperature is controlled to be ≤850° C., and a coiling temperature is controlled to be 500-750° C. Herein, when the finishing rolling temperature is higher than 850° C., the precipitation of sulfide and nitride inclusions in the rolling process will be accelerated, which will inhibit the recrystallization effect of the hot-rolled steel sheet. Meanwhile, in view of the temperature drop range in the hot rolling process, the upper limit of the coiling temperature is set to be 750° C. Moreover, taking into account that when the coiling temperature is too low, the difficulty of steel sheet coiling will increase and problems such as poor shape of coiled sheet will occur, the lower limit of the coiling temperature is set to be 500° C.

Preferably, in the manufacturing method according to the present invention, a single cold rolling process or a double cold rolling process with an intermediate annealing is used in the step of cold rolling. Herein, by using the single cold rolling process, the production process can be greatly shortened, the manufacturing cost can be reduced, and the yield of the steel sheet can be increased. Therefore, the single cold rolling process is recommended. In another respect, when the double cold rolling process with an intermediate annealing is used, the rolling difficulty of cold rolling can be significantly lowered, and a better recrystallization effect of the microstructure of the intermediate steel sheet can be achieved. Therefore, the double cold rolling process with an intermediate annealing can be used when rolling equipment has advantages or special requirements for electromagnetic properties.

Preferably, in the manufacturing method according to the present invention, in the step of cold rolling: at least one pair of working rolls in each pass or stand has a surface roughness of ≤0.40 μm; and/or each pass or stand has an accumulative reduction ratio of 75-85%, and the final pass or stand has a reduction ratio of ≤20%.

In some preferred embodiments, in the hot rolling process of the continuous casting billet, the thickness of the hot-rolled steel sheet can be controlled to be 0.8-2.0 mm after rough rolling and finish rolling of hot rolling. Therefore, by reducing the thickness of the hot-rolled steel sheet, the overall temperature of the hot-rolled steel sheet in the hot rolling process can be raised, the temperature difference among the center, the upper surface and the lower surface of the hot-rolled steel sheet can be reduced, thereby promoting sufficient recrystallization and grain size growth and thus increasing the ratios of the favorable {100} plane texture and {110} plane texture in the steel.

In addition, in the above-mentioned solution, the single cold rolling process or the double cold rolling process with an intermediate annealing may be utilized, at least one pair of working rolls in each pass or stand has a surface roughness of ≤0.40 μm, and the final pass or stand has a reduction ratio of ≤20% so as to ensure the shape of a finished sheet such that the finished sheet after rolling has no edge crack, and to provide favorable conditions for subsequent annealing and applying coating. The accumulative reduction ratio of each pass or stand is controlled to be 75-85% to ensure that: no broken coarse columnar grains are generated, the rolling breakage and edge cracks of P-containing steel are controlled, the development of the coarse deformed grains is inhibited, and favorable conditions are provided for the sufficient recrystallization in the annealing process of finished steel sheets. In another respect, when the reduction ratio of the final pass in cold rolling is reduced, the number of dislocations in the cold-rolled steel sheet is reduced, a large amount of lattice distortion is not prone to occur, and lower energy storage is maintained. Therefore, in the subsequent continuous annealing process, crystal restoration can be effectively inhibited, and the remaining deformation storage energy before recrystallization can be increased; thus, the driving force for nucleation is increased, and the strength of <111>//ND recrystallization texture components is lowered, which is conducive to the improvement of electromagnetic properties.

Compared with the prior art, the high-strength non-oriented electrical steel sheet with excellent magnetic properties and the manufacturing method therefor disclosed by the present invention have the following advantages and beneficial effects:

By optimizing the design of the chemical composition of the high-strength non-oriented electrical steel sheet according to the present invention, the cleanliness of steel is improved, and thus high-strength non-oriented electrical steel sheets with excellent magnetic properties are obtained.

In addition, the manufacturing method according to the present invention also has the above-mentioned advantages and beneficial effects.

DETAILED DESCRIPTION

Figure 1:
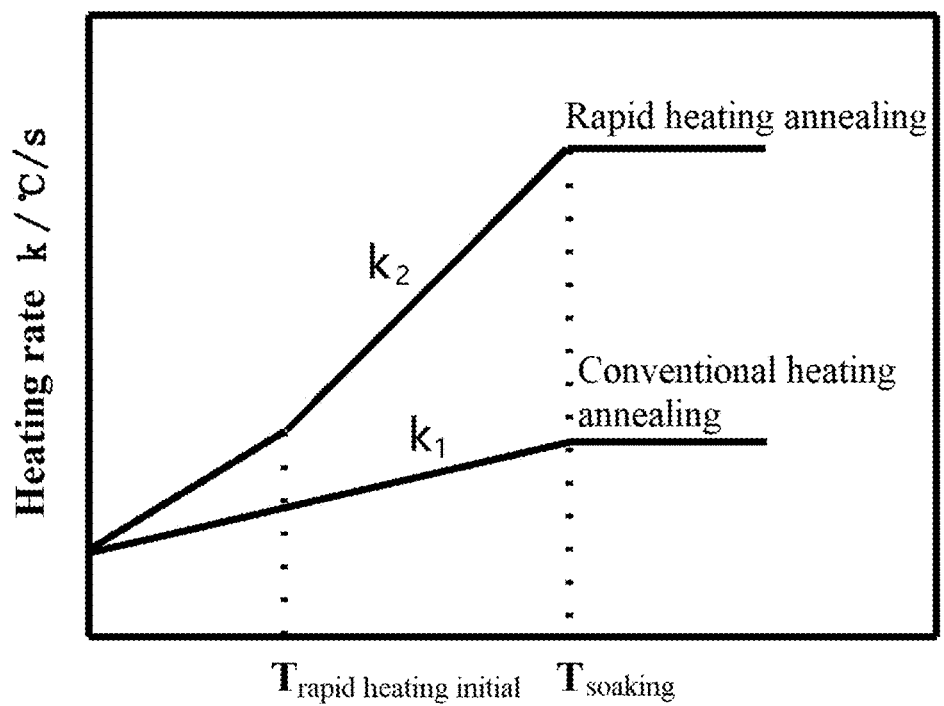
FIG. 1 is a schematic diagram of annealing process curves using different annealing processes, i.e., the present technical solution and conventional process.

The high-strength non-oriented electrical steel sheet with excellent magnetic properties and manufacturing method thereof according to the present invention will be further explained and illustrated below in combination with the accompanying drawings and specific embodiments. However, the technical solutions of the present invention are not limited to the explanation and illustration.

Inventive Examples A9-A20 and Comparative Examples A1-A8

The high-strength non-oriented electrical steel sheets in Inventive Examples A9-A20 and conventional steel sheets in Comparative Examples A1-A8 were manufactured by the following steps.

(1) The molten iron and steel scrap were prepared according to the compositions as shown in Table 1. After converter smelting, RH refining which included decarbonization, deoxidation and alloying was carried out, and then the molten steel was cast by continuous casting to obtain a continuous casting billet.

(2) Hot rolling: the thickness of a hot-rolled steel sheet was controlled to be 0.8-2.0 mm, a finishing rolling temperature was controlled to be ≤850° C., and a coiling temperature was controlled to be 500-750° C.

(3) Normalizing: the hot-rolled steel sheet was normalized, wherein the soaking temperature for normalizing was set to be 800-1000° C. and the soaking time was set to be 1-180 s.

(4) Cold rolling: the steel sheet was rolled to a thickness of the finished product by using a single cold rolling process, wherein the thickness was 0.1-0.3 mm.

(5) Continuous annealing: a cold-rolled steel sheet was rapidly heated from an initial temperature $T_{rapid\ heating\ initial}$ to a soaking temperature at a heating rate of 50-2000° C./s to perform rapid heating annealing, wherein the volume content of $H_2$ in an annealing furnace was ≥55% and a dew point in the annealing furnace was ≤−30° C.; and after the rapid heating annealing, the steel sheet was slowly cooled at a cooling rate ≤5° C./s. The initial temperature for rapid heating $T_{rapid\ heating\ initial}$ ranged from room temperature to 750° C.

(6) An insulation coating was applied to obtain a finished non-oriented electrical steel sheet.

In some preferred embodiments, in the step of RH refining, the t/ΣAl value is in the range of 0.30-0.65, wherein t represents a time interval in minutes between adding the at least one of elements Mg, Ca and REM and adding the element Al, and ΣAl represents a total time in minutes from adding the element Al to the end of RH refining.

In some preferred embodiments, a single cold rolling process or a double cold rolling process with an intermediate annealing is utilized in step (4). And/or, in step (4), at least one pair of working rolls in each pass or stand has a surface roughness of ≤0.40 μm; and/or each pass or stand has an accumulative reduction ratio of 75-85%, and the final pass or stand has a reduction ratio of ≤20%.

Table 1 lists the mass percentages of chemical elements of the high-strength non-oriented electrical steel sheets according to Inventive Examples A9-A20 and the conventional steel sheets according to Comparative Examples A1-A8.

Table 2 lists the specific process parameters of the high-strength non-oriented electrical steel sheets according to Inventive Examples A9-A21 and the conventional steel sheets according to Comparative Examples A1-A8. For Comparative Examples A1 and A4, the initial temperature for rapid heating $T_{rapid\ heating\ initial}$ was "/", which indicated that a rapid heating process was not utilized.

TABLE 1

(%, the balance being Fe and other impurities other than S, Ti, O and N)

| No. | C | Si | Mn | P | S | Al | O | N | Ti |
|---|---|---|---|---|---|---|---|---|---|
| A1 | 0.0011 | 1.68 | 0.57 | 0.18 | 0.0028 | 2.16 | 0.0022 | 0.0018 | 0.0020 |
| A2 | 0.0007 | 1.94 | 1.37 | 0.13 | 0.0025 | 0.71 | 0.0018 | 0.0013 | 0.0009 |
| A3 | 0.0024 | 2.07 | 0.84 | 0.08 | 0.0013 | 0.92 | 0.0027 | 0.0012 | 0.0011 |
| A4 | 0.0006 | 2.11 | 0.41 | 0.06 | 0.0019 | 1.85 | 0.0011 | 0.0025 | 0.0007 |
| A5 | 0.0018 | 2.83 | 1.00 | 0.06 | 0.0015 | 0.48 | 0.0009 | 0.0014 | 0.0005 |
| A6 | 0.0021 | 2.84 | 0.49 | 0.05 | 0.0035 | 1.93 | 0.0017 | 0.0009 | 0.0007 |
| A7 | 0.0007 | 3.17 | 0.21 | 0.02 | 0.0011 | 0.003 | 0.0008 | 0.0012 | 0.0005 |
| A8 | 0.0018 | 3.65 | 0.87 | 0.06 | 0.0008 | 1.52 | 0.0006 | 0.0019 | 0.0012 |
| A9 | 0.0022 | 2.15 | 1.16 | 0.18 | 0.0018 | 0.42 | 0.0007 | 0.0017 | 0.0005 |
| A10 | 0.0027 | 2.18 | 0.94 | 0.03 | 0.0008 | 1.91 | 0.0006 | 0.0011 | 0.0005 |
| A11 | 0.0012 | 3.05 | 0.40 | 0.20 | 0.0030 | 1.14 | 0.0011 | 0.0013 | 0.0007 |
| A12 | 0.0035 | 2.00 | 0.77 | 0.08 | 0.0020 | 0.75 | 0.0020 | 0.0008 | 0.0004 |
| A13 | 0.0017 | 2.85 | 0.48 | 0.15 | 0.0015 | 0.97 | 0.0007 | 0.0012 | 0.0010 |
| A14 | 0.0032 | 2.91 | 0.82 | 0.07 | 0.0008 | 0.68 | 0.0006 | 0.0006 | 0.0008 |
| A15 | 0.0024 | 2.90 | 0.48 | 0.13 | 0.0011 | 0.40 | 0.0011 | 0.0020 | 0.0006 |
| A16 | 0.0014 | 3.14 | 0.81 | 0.08 | 0.0006 | 0.52 | 0.0007 | 0.0009 | 0.0006 |
| A17 | 0.0023 | 2.88 | 0.67 | 0.05 | 0.0014 | 2.00 | 0.0014 | 0.0012 | 0.0004 |
| A18 | 0.0012 | 3.21 | 0.83 | 0.05 | 0.0005 | 0.80 | 0.0005 | 0.0008 | 0.0005 |
| A19 | 0.0016 | 3.50 | 1.20 | 0.04 | 0.0008 | 0.42 | 0.0006 | 0.0010 | 0.0005 |
| A20 | 0.0028 | 3.48 | 0.41 | 0.04 | 0.0005 | 1.35 | 0.0008 | 0.0005 | 0.0008 |

| No. | Mg | Ca | REM | Sn | Sb | Note |
|---|---|---|---|---|---|---|
| A1 | 0.002 | 0.002 | 0.002 | / | / | Comparative Example |
| A2 | / | / | / | 0.03 | 0.03 | Comparative Example |
| A3 | 0.008 | / | / | 0.03 | 0.007 | Comparative Example |
| A4 | / | 0.005 | / | 0.05 | 0.08 | Comparative Example |
| A5 | / | / | 0.004 | / | 0.12 | Comparative Example |
| A6 | 0.005 | 0.003 | 0.002 | 0.18 | / | Comparative Example |
| A7 | 0.001 | 0.003 | 0.006 | 0.01 | 0.16 | Comparative Example |
| A8 | 0.003 | 0.005 | 0.001 | 0.003 | 0.01 | Comparative Example |
| A9 | 0.0005 | / | / | 0.05 | / | Inventive Example |
| A10 | 0.005 | / | 0.005 | / | 0.04 | Inventive Example |
| A11 | 0.008 | 0.0011 | / | 0.03 | 0.05 | Inventive Example |
| A12 | 0.001 | 0.0005 | 0.003 | 0.10 | 0.10 | Inventive Example |
| A13 | 0.005 | 0.001 | 0.0005 | 0.01 | 0.01 | Inventive Example |
| A14 | 0.001 | 0.003 | 0.001 | 0.003 | / | Inventive Example |
| A15 | / | / | 0.0005 | 0.01 | 0.03 | Inventive Example |
| A16 | / | 0.002 | 0.007 | 0.18 | / | Inventive Example |
| A17 | 0.001 | / | 0.008 | / | 0.11 | Inventive Example |
| A18 | 0.001 | 0.001 | 0.001 | 0.05 | 0.02 | Inventive Example |
| A19 | / | 0.008 | 0.002 | 0.04 | 0.08 | Inventive Example |
| A20 | / | 0.010 | / | 0.05 | 0.007 | Inventive Example |

TABLE 2

| No. | Elements used for deoxidation | t/ΣAl Value | Hot-rolled steel sheet thickness [mm] | Finishing rolling temp. [° C.] | Coiling temp. [° C.] | Cold rolling mode | Surface roughness of roll [μm] | Total reduction ratio [%] |
|---|---|---|---|---|---|---|---|---|
| A1 | Si | / | 2.0 | 820 | 750 | Single | 1.0 | 87.5 |
| A2 | Al | 0.41 | 2.0 | 850 | 570 | Single | 0.4 | 90.0 |
| A3 | Si | / | 2.8 | 850 | 550 | Single | 0.2 | 91.1 |
| A4 | Al | 0.17 | 1.6 | 835 | 600 | Double | 0.4 | 90.6 |
| A5 | Al | 0.78 | 1.8 | 825 | 620 | Single | 2.0 | 86.1 |
| A6 | Si | / | 2.0 | 840 | 680 | Double | 0.2 | 85.0 |
| A7 | Al | 0.52 | 2.0 | 850 | 570 | Single | 0.6 | 87.5 |
| A8 | Al | 0.39 | 2.0 | 815 | 600 | Single | 0.1 | 87.5 |
| A9 | Si | 0.52 | 1.6 | 850 | 750 | Single | 0.4 | 84.4 |
| A10 | Si | 0.30 | 1.8 | 840 | 650 | Single | 0.1 | 83.3 |
| A11 | Si | 0.65 | 1.2 | 840 | 620 | Single | 0.2 | 75 |
| A12 | Si | 0.52 | 1.6 | 855 | 570 | Double | 0.4 | 84.4 |
| A13 | Si | 0.40 | 0.8 | 815 | 500 | Single | 0.4 | 81.3 |
| A14 | Si | 0.49 | 1.2 | 845 | 650 | Single | 0.2 | 79.2 |
| A15 | Si | 0.60 | 2.0 | 820 | 550 | Single | 0.2 | 85.0 |
| A16 | Si | 0.62 | 2.0 | 825 | 680 | Single | 0.1 | 85.0 |
| A17 | Si | 0.52 | 2.0 | 840 | 570 | Single | 0.3 | 85.0 |
| A18 | Si | 0.42 | 2.0 | 835 | 650 | Double | 0.3 | 85.0 |
| A19 | Si | 0.63 | 1.2 | 815 | 530 | Single | 0.2 | 83.3 |
| A20 | Si | 0.48 | 1.6 | 825 | 720 | Double | 0.3 | 84.4 |

| No. | Reduction ratio of final pass or stand [%] | $T_{rapid\ heating\ initial}$ [° C.] | Heating rate [° C./s] | Dew point in furnace [° C.] | $H_2$ Content [%] | Cooling rate [° C./s] | Note* |
|---|---|---|---|---|---|---|---|
| A1 | 5 | / | 75 | −20 | 30% | 1 | CE |
| A2 | 10 | 25 | 150 | −38 | 40% | 2 | CE |
| A3 | 15 | 300 | 350 | −35 | 55% | 2 | CE |
| A4 | 20 | / | 75 | −30 | 60% | 1 | CE |
| A5 | 5 | 600 | 600 | −28 | 57% | 2 | CE |
| A6 | 10 | 450 | 400 | −32 | 60% | 3 | CE |
| A7 | 15 | 100 | 1800 | −37 | 62% | 6 | CE |
| A8 | 20 | 200 | 200 | −35 | 65% | 4 | CE |
| A9 | 20 | 400 | 2000 | −40 | 55 | 1 | IE |
| A10 | 5 | 500 | 50 | −37 | 57 | 2 | IE |
| A11 | 15 | 200 | 200 | −40 | 60 | 2 | IE |
| A12 | 10 | 300 | 300 | −35 | 60 | 2 | IE |
| A13 | 15 | 750 | 500 | −40 | 55 | 5 | IE |
| A14 | 8 | 200 | 100 | −30 | 55 | 3 | IE |
| A15 | 12 | 350 | 400 | −35 | 55 | 2 | IE |
| A16 | 15 | 600 | 350 | −38 | 63 | 2 | IE |
| A17 | 20 | 400 | 300 | −37 | 61 | 1 | IE |
| A18 | 5 | 550 | 550 | −35 | 57 | 1 | IE |
| A19 | 15 | 650 | 600 | −38 | 55 | 4 | IE |
| A20 | 5 | 750 | 300 | −40 | 65 | 3 | IE |

* CE= Comparative Example;
IE= Inventive Example

Table 3 lists the performance values of the high-strength non-oriented electrical steel sheets according to Examples A9-A20 and conventional steel sheets according to Comparative Examples A1-A8.

TABLE 3

| No. | Tensile strength [MPa] | Iron loss $P_{15/50}$ [W/kg] | Magnetic induction $B_{50}$ [T] | Note |
|---|---|---|---|---|
| A1 | 484 | 2.47 | 1.65 | Comparative Example |
| A2 | 511 | 2.61 | 1.64 | Comparative Example |
| A3 | 524 | 2.70 | 1.63 | Comparative Example |
| A4 | 498 | 2.35 | 1.65 | Comparative Example |
| A5 | 537 | 2.18 | 1.67 | Comparative Example |
| A6 | 531 | 2.20 | 1.68 | Comparative Example |
| A7 | 510 | 2.11 | 1.62 | Comparative Example |
| A8 | 581 | 2.18 | 1.62 | Comparative Example |
| A9 | 611 | 1.94 | 1.70 | Inventive Example |
| A10 | 632 | 1.85 | 1.71 | Inventive Example |
| A11 | 618 | 1.90 | 1.70 | Inventive Example |
| A12 | 627 | 1.94 | 1.71 | Inventive Example |
| A13 | 635 | 1.91 | 1.71 | Inventive Example |
| A14 | 660 | 1.88 | 1.69 | Inventive Example |
| A15 | 704 | 1.79 | 1.70 | Inventive Example |
| A16 | 641 | 1.91 | 1.71 | Inventive Example |
| A17 | 665 | 1.89 | 1.70 | Inventive Example |
| A18 | 682 | 1.88 | 1.69 | Inventive Example |
| A19 | 739 | 1.86 | 1.70 | Inventive Example |
| A20 | 659 | 1.84 | 1.69 | Inventive Example |

Figure 2:
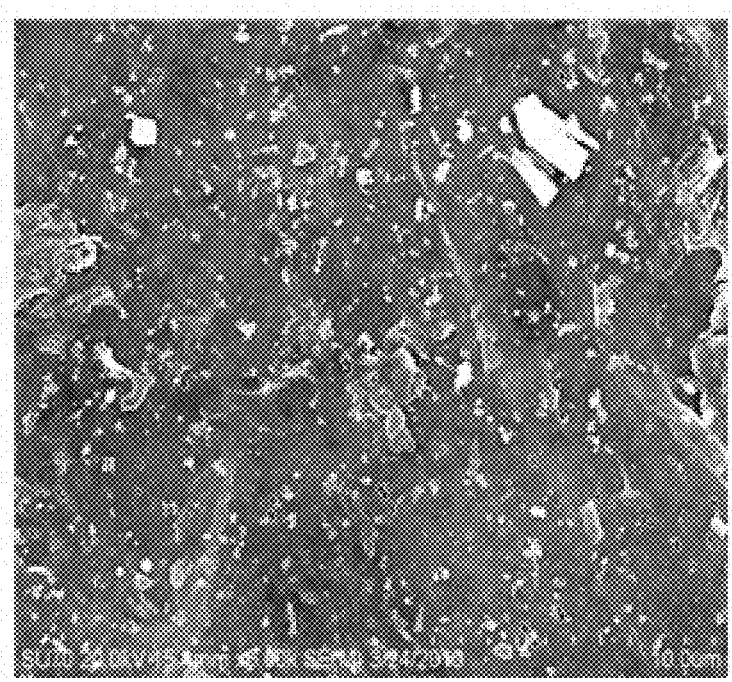
FIG. 2 is a SEM diagram of the conventional steel sheet in Comparative Example A2.
Figure 3:
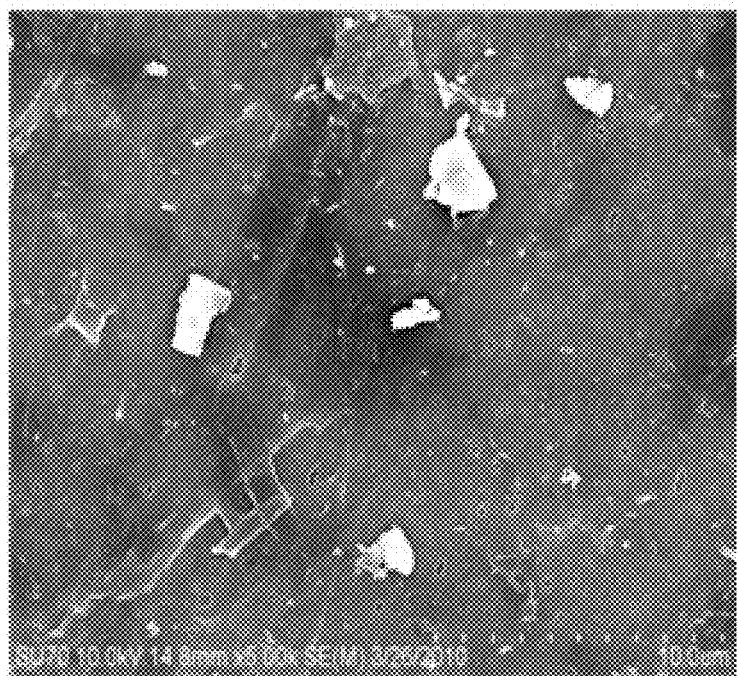
FIG. 3 is a SEM diagram of the high-strength non-oriented electrical steel sheet in Inventive Example A17.

As can be seen from FIGS. 1 to 3, the high-strength non-oriented electrical steel sheets in all Inventive Examples had high cleanliness, as well as a small quantity and a large size of inclusions; moreover, the finished steel sheets had good recrystallization effect, uniform and coarse grain size, a high proportion of favorable textures, and excellent electromagnetic properties, wherein the high-strength non-oriented electrical steel sheets according to each Inventive Example had an iron loss $P_{15/50}$ of ≤2 W/kg, a magnetic induction $B_{50}$ of ≥1.69 T and a tensile strength of ≥600 MPa.

FIG. 1 is a schematic diagram of annealing process curves using different annealing processes, i.e., the present technical solution and conventional process.

As shown in FIG. 1, in the manufacturing method according to the present invention, the rapid heating annealing was utilized, which was different from a conventional heating annealing process. The heating rate in the present invention was controlled to be 50-2000° C./s due to the facts that: if the heating rate is too fast, the requirements for equipment capabilities will be too high, the cost will be expensive, and the residence time of the cold-rolled steel sheet in the high temperature stage will be too long, resulting in poor uniformity of the grain structure. Meanwhile, in view of the fact that (internal) oxidation and nitridation are prone to occur on the surface of the finished steel sheet under high temperature annealing conditions, it will result in grain refinement, the deterioration of iron loss of finished steel sheet and the decrease of the surface quality of finished steel sheet. Therefore, the volume content of $H_2$ in the annealing furnace is controlled to be ≥55% and a dew point in the annealing furnace is controlled to be ≤−30° C. After the rapid heating annealing, the finished steel sheet is required to be slowly cooled, and a cooling rate is required to be limited to be ≤5° C./s, so as to control the shape of the finished steel sheet and to reduce the stress in the steel sheet, and thus, the finally obtained non-oriented electrical steel sheet has good surface condition and is characterized by high magnetic induction, low iron loss and high strength.

FIG. 2 is a SEM diagram of the conventional steel sheet in Comparative Example A2. FIG. 3 is a SEM diagram of the high-strength non-oriented electrical steel sheet in Inventive Example A17.

As can be seen from FIGS. 2 and 3, compared with Comparative Example A2, the high-strength non-oriented electrical steel sheet in Inventive Example A17 had high cleanliness, as well as a smaller quantity and a larger size of inclusions.

The inclusions in the specimens of finished products corresponding to Comparative Example A2 and Inventive Example A17 were observed with a HITACHI S4200 Scanning Electron Microscope. Each specimen was continuously observed for 10 fields of view. The distribution of the types, sizes and quantities of inclusions were counted and listed in Tables 4 and 5.

Table 4 lists the types, sizes and quantities of inclusions in the specimen of finished product according to Comparative Example A2.

Table 5 lists the types, sizes and quantities of inclusions in the specimen of finished product according to Inventive Example A17.

TABLE 5

| Inclusions | AlN | CaS | $SiO_2$ | $Al_2O_3$ + MgO/$SiO_2$ | AlN + CaS | FeO | Total |
|---|---|---|---|---|---|---|---|
| 0-0.5 μm | | | Almost no | | | | |
| 0.5-1.0 μm | 14 | 0 | 0 | 0 | 0 | 0 | 14 |
| 1.0-1.5 μm | 14 | 8 | 0 | 0 | 0 | 0 | 22 |
| 1.5-5.0 μm | 101 | 19 | 0 | 4 | 4 | 0 | 128 |
| 5.0-10 μm | 0 | 0 | 1 | 1 | 0 | 0 | 2 |

Figure 4:
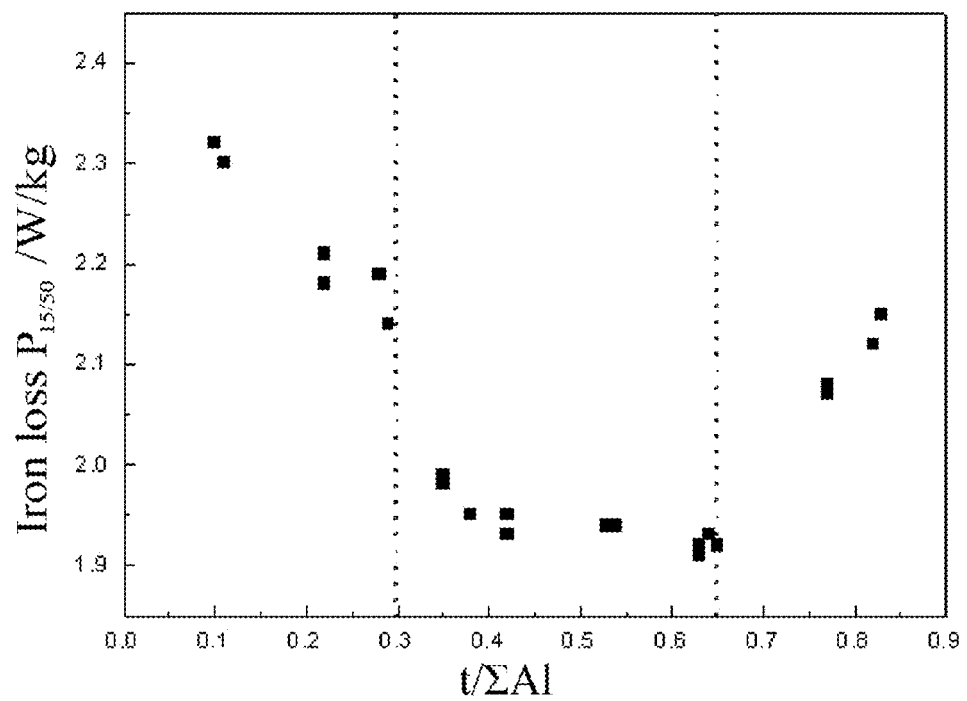
FIG. 4 schematically shows the effect of different t/ΣAl values on iron loss.
Figure 5:
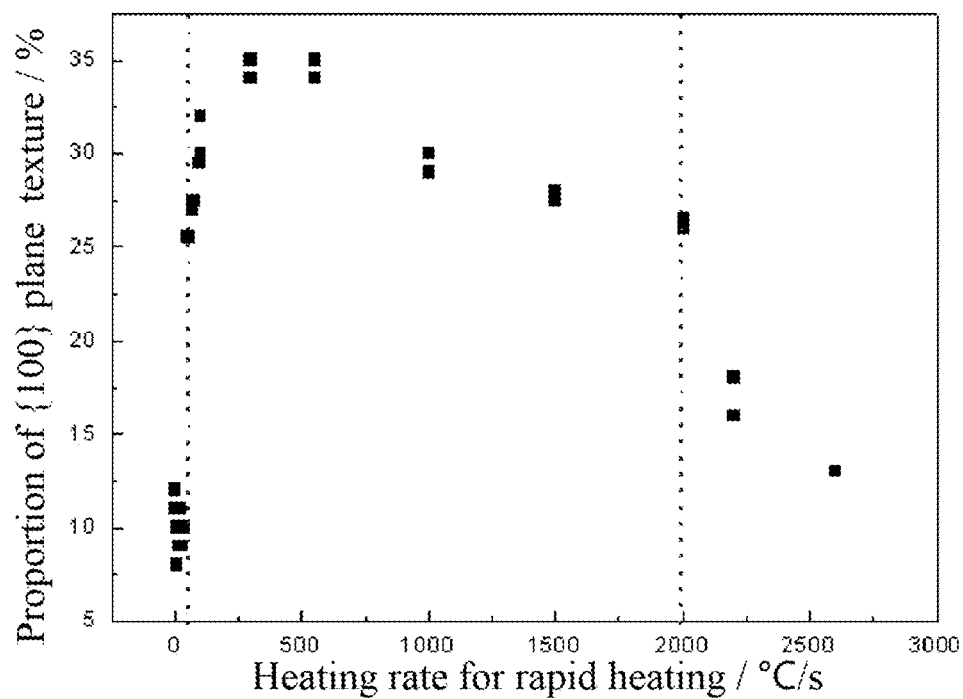
FIG. 5 schematically shows the effect of different heating rates on the proportion of {100} plane texture.

As can be seen from FIGS. 4 and 5, according to the statistic data of inclusions, for the specimen of finished product in Comparative Example A2, there were a large quantity of AlN, MnS and $Cu_2S$ inclusions with a size of 0.5 μm or less; the inclusions with a size of 0.5 μm or more were mainly AlN+MnS composite inclusions or MnS+$Cu_2S$ composite inclusions, which were larger in quantity and smaller in size; and further, the specimen also contained a small quantity of oxide inclusions. In contrast, for the specimen of finished product in the Inventive Example, there were almost no inclusions with a size of 0.5 μm or less; and the inclusions with a size of 0.5 μm or more were mainly AlN and CaS, accompanied by a small quantity of oxide inclusions and AlN+CaS composite inclusions which were relatively large in size.

The reasons were as follows: during the solidification process of the molten steel of the Comparative Example, oxide inclusions of larger size were first precipitated, and then MnS inclusions began to precipitate as the temperature of the molten steel continued to drop, and finally the AlN and $Cu_2S$ inclusions were precipitated with the MnS inclusion as the core respectively. In contrast, during the solidification process of the molten steel of the Inventive Example, oxide inclusions of larger size had fully floated, and the binding capacity of Mg, Ca and REM with the element S was much greater than that of the elements Mn and S with the elements Cu and S, such that MgS, CaS and REM-S inclusions with a melting point as high as 2500° C. would be preferentially precipitated, thereby effectively inhibiting the precipitation of MnS and $Cu_2S$ inclusions. Then, AlN inclusions began to precipitate as the temperature of the molten steel continued to drop. Since most of the molten steel had solidified at this time, only a small quantity of AlN inclusions can be combined with CaS inclusions to form AlN+CaS composite inclusions of relatively larger size that were prone to float and remove.

FIG. 4 schematically shows the effect of different t/ΣAl values on iron loss.

As shown in FIG. 4, in the step of RH refining, when the t/ΣAl value was controlled to be 0.30-0.65, the magnetic properties of obtained non-oriented electrical steel sheets were better. The reasons were as follows: when performing

TABLE 4

| Inclusions | AlN + MnS | FeO | FeO + $SiO_2$ | MnS + $Cu_2S$ | CaO + $Al_2O_3$ + $SiO_2$ | $Al_2O_3$ | Total |
|---|---|---|---|---|---|---|---|
| 0-0.5 μm | | A large quantity of AlN, MnS and $Cu_2S$ inclusions | | | | | |
| 0.5-1.0 μm | 44 | 0 | 0 | 20 | 3 | 0 | 67 |
| 1.0-1.5 μm | 10 | 0 | 0 | 1 | 0 | 0 | 11 |
| 1.5-5.0 μm | 18 | 6 | 1 | 2 | 2 | 4 | 33 |
| 5.0-10 μm | 0 | 0 | 3 | 0 | 0 | 0 | 3 | deoxidation alloying after decarbonization, Si is utilized for deoxidation to avoid the direct use of aluminum for deoxidation and the formation of fine-sized inclusions. After ferro-silicon alloy is added, silicon oxide inclusions are easier to float up and remove. Afterwards, as the viscosity of the molten steel increases, the alumina inclusions are not easy to float up and remove; thus, the alumina inclusions are treated with Mg, Ca and REM to generate aluminate compounds with a lower melting point, and at the same time, to suppress fine and dispersed small particle inclusions. In order to ensure the treatment effect of Mg, Ca and REM, in addition to controlling the addition amount of Mg, Ca and REM, the value of t/ΣAl may be preferably controlled to be 0.30-0.65, so as to ensure the effective concentrations of Mg, Ca and REM in the molten steel, thereby ensuring that the inclusions can be fully denatured. By controlling the residence time of Mg, Ca and REM in the molten steel, the molten steel can fully react with Mg, Ca and REM, so as to achieve a good effect of improving inclusions.

It should be noted that t represents a time interval in minutes between adding the at least one of elements Mg, Ca and REM and adding the element Al, and ΣAl represents a total time in minutes from adding the element Al to the end of RH refining.

Figure 6:
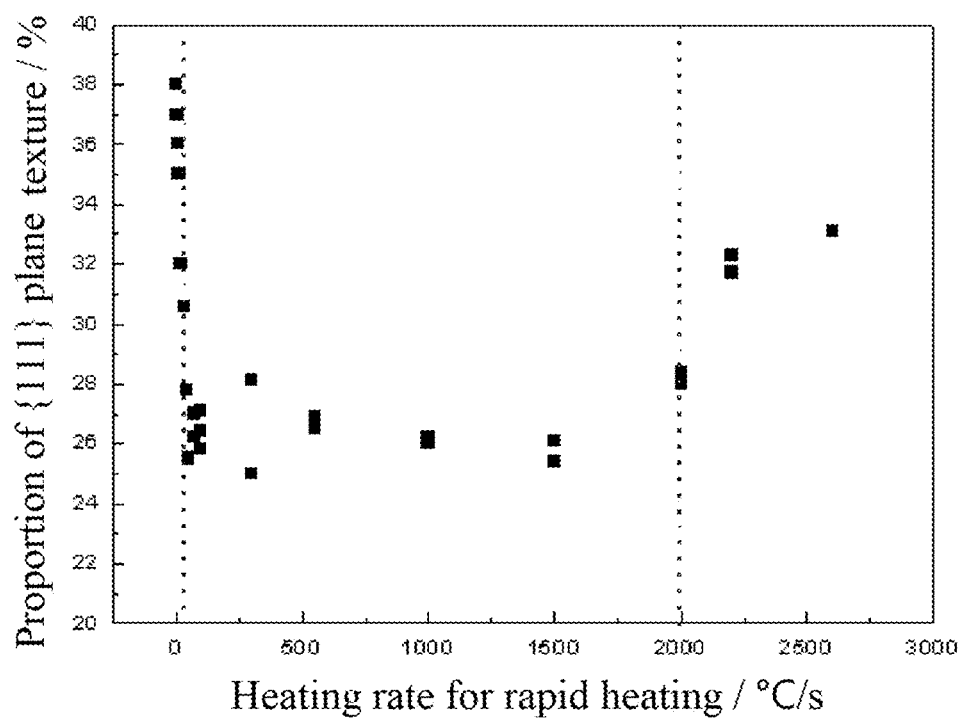
FIG. 6 schematically shows the effect of different heating rates on the proportion of {111} plane texture.

FIG. 5 schematically shows the effect of different heating rates on the proportion of {100} plane texture. FIG. 6 schematically shows the effect of different heating rates on the proportion of {111} plane texture.

As can be seen from FIGS. 5 and 6, when the heating rate was controlled to be 50-2000° C./s, the proportion of the {100} plane texture could be controlled to be ≥25%, and the proportion of the {111} plane texture could be controlled to be ≤31%. Therefore, it is proven that by utilizing the manufacturing method according to the present invention, the high-strength non-oriented electrical steel sheets had good recrystallization effect, uniform and coarse grain size, high proportion of favorable textures and excellent electromagnetic properties.

To conclude, by optimizing the design of the chemical composition of high-strength non-oriented electrical steel sheets, the cleanliness of steel was improved, and thus high-strength non-oriented electrical steel sheets with excellent magnetic properties were obtained in the present invention.

In addition, the manufacturing method according to the present invention also has the above advantages and beneficial effects.

It should be noted that for the prior art part of protection scope of the present disclosure, it is not limited to the examples given in this application document. All the prior arts that do not contradict with the present disclosure, including but not limited to prior patent documents, prior publications, prior public use, etc., can be included in the protection scope of the present disclosure.

In addition, the combination of various technical features in the present disclosure is not limited to the combination described in the claims or the combination described in specific embodiments. All the technical features described in the present disclosure can be freely combined or combined in any way unless there is a contradiction between them.

It should also be noted that the above-listed Examples are only specific embodiments of the present disclosure. Apparently, the present disclosure is not limited to the above embodiments, and similar variations or modifications that are directly derived or easily conceived from the present disclosure by those skilled in the art should fall within the scope of the present disclosure.

The invention claimed is:

1. A non-oriented electrical steel sheet having a tensile strength of 600 MPa or more, consisting of the following chemical elements in mass percentage: 0<C≤0.0035%; Si: 2.0-3.5%; Mn: 0.4-1.2%; P: 0.03-0.2%; Al: 0.4-2.0%; at least one of Sb and Sn in a total content of 0.003-0.2%; at least one of Mg, Ca and REM in a total content of 0.0005-0.01%; and the balance being Fe and unavoidable impurities, wherein the non-oriented electrical steel sheet contains AlN inclusions with a size greater than 0.5 μm and further contains CaS inclusions and/or composite inclusions of AlN and CaS with a size greater than 0.5 μm.

2. The non-oriented electrical steel sheet as claimed in claim 1, characterized in that the unavoidable impurities consist of: S≤0.003%; Ti≤0.001%; O≤0.002%; and N≤0.002%.

3. The non-oriented electrical steel sheet as claimed in claim 1, characterized in that the non-oriented electrical steel sheet has a {100} plane texture in a proportion of ≥25% and a {111} plane texture in a proportion of ≤31%.

4. The non-oriented electrical steel sheet as claimed in claim 1, characterized in that the non-oriented electrical steel sheet has an iron loss $P_{15/50}$ of ≤2 W/kg and a magnetic induction $B_{50}$ of ≥1.69T.

5. A manufacturing method for the non-oriented electrical steel sheet as claimed in claim 1, including the following steps:
  converter smelting, RH refining and casting;
  hot rolling;
  normalizing;
  cold rolling;
  continuous annealing: rapidly heating a cold-rolled steel sheet from an initial temperature for rapid heating $T_{rapid\ heating\ initial}$ to a soaking temperature at a heating rate of 50-2000° C./s to perform rapid heating annealing, wherein a volume content of $H_2$ in an annealing furnace is >55% and a dew point in the annealing furnace is <−30° C.; and after the rapid heating annealing, slowly cooling the steel sheet at a cooling rate 55C/s; and
  applying an insulation coating to obtain a finished non-oriented electrical steel sheet, thereby producing the non-oriented electrical steel sheet of claim 1.

6. The manufacturing method as claimed in claim 5, characterized in that in the step of continuous annealing, the heating rate is 100-600° C./s.

7. The manufacturing method as claimed in claim 5, characterized in that in the step of continuous annealing, the initial temperature for rapid heating $T_{rapid\ heating\ initial}$ ranges from room temperature to 750° C.

8. The manufacturing method as claimed in claim 5, characterized in that in the step of RH refining, a value of t/ΣAl is in the range of 0.30-0.65, wherein t represents a time interval in minutes between adding at least one of elements Mg, Ca and REM and adding the element Al, and ΣAl represents a total time in minutes from adding the element Al to the end of RH refining.

9. The manufacturing method as claimed in claim 5, characterized in that in the step of hot rolling, a finishing rolling temperature is controlled to be ≤850° C., and a coiling temperature is controlled to be 500-750° C.

10. The manufacturing method as claimed in claim 5, characterized in that a single cold rolling process or a double cold rolling process with an intermediate annealing is utilized in the step of cold rolling.

11. The manufacturing method as claimed in claim 10, characterized in that in the step of cold rolling, at least one pair of working rolls in each pass or stand has a surface roughness of ≤0.40 μm, and/or each pass or stand has an accumulative reduction ratio of 75-85%, and the final pass or stand has a reduction ratio of ≤20%.

* * * * *